(12) United States Patent
Gorczyca et al.

(10) Patent No.: US 9,356,434 B2
(45) Date of Patent: May 31, 2016

(54) ACTIVE IONIZATION CONTROL WITH CLOSED LOOP FEEDBACK AND INTERLEAVED SAMPLING

(71) Applicant: Illinois Tool Works Inc., Glenview, IL (US)

(72) Inventors: John A. Gorczyca, Lansdale, PA (US); Manuel C. Blanco, Hillsborough, NJ (US); Steven J. Mandrachia, Eagleville, PA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 117 days.

(21) Appl. No.: 14/460,685

(22) Filed: Aug. 15, 2014

(65) Prior Publication Data

US 2016/0049774 A1  Feb. 18, 2016

(51) Int. Cl.
| | |
|---|---|
| *H05F 3/00* | (2006.01) |
| *H01T 23/00* | (2006.01) |
| *H01T 19/00* | (2006.01) |
| *H01T 19/04* | (2006.01) |
| *G01T 1/185* | (2006.01) |

(52) U.S. Cl.
CPC ........ *H01T 23/00* (2013.01); *H05F 3/00* (2013.01); *B65H 2301/5133* (2013.01); *G01T 1/185* (2013.01); *H01T 19/00* (2013.01); *H01T 19/04* (2013.01)

(58) Field of Classification Search
USPC ................................................ 361/212, 213
See application file for complete search history.

(56) References Cited

U.S. PATENT DOCUMENTS

| | | |
|---|---|---|
| 3,035,517 A | 1/1976 | O'Brien |
| 4,234,249 A | 11/1980 | Weikel et al. |

(Continued)

FOREIGN PATENT DOCUMENTS

WO    2007118182 A2    10/2007

OTHER PUBLICATIONS

Int'l Search Report and Written Opinion issued Sep. 11, 2015 in Int'l Application No. PCT/US2015/039907.

*Primary Examiner* — Danny Nguyen
(74) *Attorney, Agent, or Firm* — Panitch Schwarze Belisario & Nadel LLP

(57) ABSTRACT

An ionization system includes a power supply and an ionizer. In a first operating state, properties of an output are set to fixed non-zero baseline levels, and in a second operating state, are set to neutralizing levels. The fixed baseline level is different than the neutralizing level for at least one of the properties. A downstream charge sensor measures an object charge. A controller switches the power supply between the first and second states during a sequence of alternating first and second time periods, during the first time period only, senses a current flow to the ionizer, during the second time period only, receives measured charge data from the sensor, during the second time period only, adjusts the neutralizing levels based on the charge data, and during the first or second time period, calculates an upstream object charge based on sensed current flow or determines a relative ionizer condition.

19 Claims, 3 Drawing Sheets

(56) References Cited

U.S. PATENT DOCUMENTS

| | | | |
|---|---|---|---|
| 4,423,461 A | 12/1983 | Kaainoa et al. | |
| 4,757,422 A | 7/1988 | Bossard et al. | |
| 4,809,127 A | 2/1989 | Steinman et al. | |
| 4,901,194 A | 2/1990 | Steinman et al. | |
| 5,432,454 A * | 7/1995 | Durkin | H05F 3/04 264/484 |
| 5,703,360 A | 12/1997 | Fischer et al. | |
| 5,930,105 A | 7/1999 | Pitel et al. | |
| 6,130,815 A | 10/2000 | Pitel et al. | |
| 6,259,591 B1 | 7/2001 | Pitel et al. | |
| 6,375,714 B1 | 4/2002 | Rump et al. | |
| 7,180,722 B2 | 2/2007 | Jacobs et al. | |
| 7,238,956 B2 | 7/2007 | Gierak et al. | |
| 7,256,979 B2 | 8/2007 | Sekoguchi et al. | |
| 7,372,023 B2 | 5/2008 | Sobek et al. | |
| 7,522,402 B2 | 4/2009 | Kraz et al. | |
| 7,763,853 B2 | 7/2010 | Walsh | |
| 8,039,789 B2 | 10/2011 | Gorczyca et al. | |
| 8,681,470 B2 | 3/2014 | Gorczyca et al. | |
| 2003/0067732 A1 | 4/2003 | Richie et al. | |
| 2004/0239346 A1 | 12/2004 | Iyer et al. | |
| 2008/0232021 A1 | 9/2008 | Gefter et al. | |
| 2009/0127452 A1 | 5/2009 | Gorczyca et al. | |
| 2009/0128981 A1 | 5/2009 | Gorczyca et al. | |
| 2010/0220243 A1 | 9/2010 | Chien et al. | |
| 2013/0271164 A1 * | 10/2013 | Savich | G01R 27/2605 324/679 |

* cited by examiner

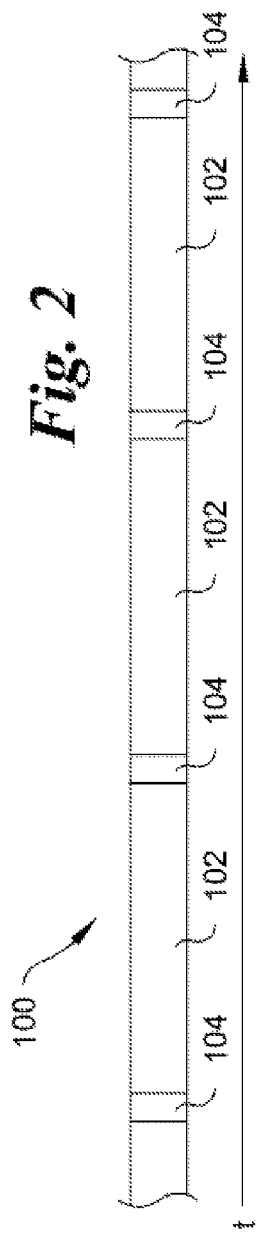
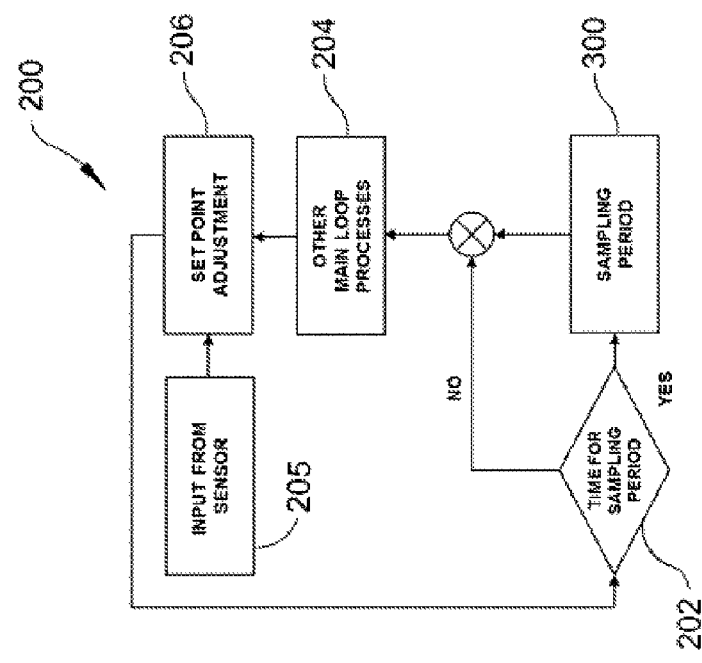

ACTIVE IONIZATION CONTROL WITH CLOSED LOOP FEEDBACK AND INTERLEAVED SAMPLING

BACKGROUND OF THE INVENTION

Embodiments of the present invention relate generally to an ionization system, and more particularly, to an ionization system with closed loop feedback and interleaved periods of sampling to determine upstream charge on an object and to determine a condition of the ionization system.

Air ionization is an effective method of eliminating static charges on target surfaces. Air ionizers generate large quantities of positive and negative ions in the surrounding atmosphere that serve as mobile carriers of charge in the air. As ions flow through the air, they are attracted to oppositely charged particles and surfaces. Neutralization of electrostatically charged surfaces can be rapidly achieved through this process.

Air ionization may be performed using electrical ionizers, which generate ions in a process known as corona discharge. Electrical ionizers generate air ions by intensifying an electric field around a sharp point until the field overcomes the dielectric strength of the surrounding air. Negative corona discharge occurs when electrons are flowing from the electrode into the surrounding air. Positive corona discharge occurs as a result of the flow of electrons from the air molecules into the electrode.

Ionizer devices, such as an alternating current (AC) or direct current (DC) charge neutralizing system, take many forms, such as ionizing bars, air ionization blowers, air ionization nozzles, and the like, and are utilized to neutralize static electrical charge by emitting positive and negative ions into the workspace or onto the surface of an area. Ionizing bars are typically used in continuous web operations such as paper printing, polymeric sheet material, or plastic bag fabrication. Air ionization blower and nozzles are typically used in workspaces for assembling electronics equipment such as hard disk drives, integrated circuits, and the like, that are sensitive to electrostatic discharge (ESD).

In a typical closed loop ionization system for conveyed materials (e.g., webs or the like), sensors are located downstream from the ionizer device. These sensors, typically electrostatic field meters or the like, evaluate residual charge on the material and a feedback signal is returned to the ionization system to drive the residual charge to zero, or as close to zero as possible. In these systems the downstream residual voltage is well characterized by information from the feedback sensor. The actual voltage on the conveyed material coming into the ionization system, i.e., the upstream voltage, is unknown. This information is important for safety and process control.

To determine the upstream voltage, an additional sensor located upstream of the ionizer device is necessary. This adds to the expense of the system, but more importantly, the charges on the conveyed material upstream of the ionizer device may be high (e.g., 10 kV or higher) and beyond the capabilities of standard charge sensors.

In addition, over time, an ionizer may accumulate debris. In order to maintain optimal performance of the ionizer, it is necessary to clean the ionizer in order to remove the debris. As an ionizer accumulates debris, the ionizer's charge will decrease and, therefore, the current flowing from the voltage supply into the ionizer will also decrease. A method for having the ionization system self-calibrate and indicate performance is described in U.S. Pat. No. 8,039,789 (Gorczyca, et al.), the entire contents of which are incorporated by reference herein. However, the method requires the initial accumulation of calibration data for a plurality of operating states of the high voltage power supply. Real-time data, in particular a sum of the current output to the positive and negative ionizers, acquired during operation is then compared to the closest data point to determine a difference in performance. The accumulation of calibration data for what may be 250 or more data points can be time consuming, and requires a large memory space to store the necessary baseline table.

It is desirable to provide an ionization system that can provide closed loop feedback and estimate upstream charge without the need for an additional upstream sensor.

BRIEF SUMMARY OF THE INVENTION

Briefly stated, an embodiment of the present invention comprises an ionization system for applying or removing charge to a moving object. The system includes a power supply and at least one ionizer coupled to the power supply and receiving an output therefrom. The power supply has a first operating state such that one or more properties of the output are set to fixed non-zero baseline levels, and a second operating state such that the one or more properties of the output are set to neutralizing levels. The fixed baseline level for at least one of the one or more properties of the output is different than the neutralizing level for the at least one of the one or more properties. A charge sensor is arranged downstream of the at least one ionizer and configured to measure a charge on the object. A controller is coupled to an output of the charge sensor and is coupled to the power supply to control the output to the at least one ionizer. The controller is configured to (i) switch the power supply between the first and second states during a sequence of a plurality of alternating first and second time periods, (ii) during the first time period only, sense a current flow to the at least one ionizer with the power supply set to the first operating state, (iii) during the second time period only, set the power supply to the second state and receive measured charge data from the charge sensor, (iv) during the second time period only, adjust at least one of the neutralizing levels for the one or more properties of the output of the power supply in the second operating state based on the measured charge data from the charge sensor, (v) during one of the first and second time periods, perform at least one of a calculation of an upstream charge on the object based in part on the sensed current flow and a determination of a relative condition of the at least one ionizer, and (vi) periodically repeat steps (ii)-(v) for successive pairs of the first and second time periods.

A further embodiment of the present invention comprises a method for monitoring the condition of an ionization system for applying or removing charge from a moving object. The ionization system has a power supply configured to provide an output to at least one ionizer, a charge sensor arranged downstream of the at least one ionizer, and a controller coupled to an output of the charge sensor and to the power supply. The power supply has a first operating state such that one or more properties of the output are set to fixed non-zero baseline levels, and a second operating state such that the one or more properties of the output are set to neutralizing levels. The fixed non-zero baseline level for at least one of the one or more properties is different than the neutralizing level for the at least one of the one or more properties. The controller is configured to switch the power supply between the first and second operating states during a sequence of a plurality of alternating first and second time periods. The method includes (a) during the first time period only, sensing a current flow to the at least one ionizer with the power supply set to the first operating state, (b) during the second time period only, setting the power supply to the second state and receiving measured charge data from the charge sensor, (c) during the second time period only, adjusting at least one of the neutralizing levels for the one or more properties of the output of the power supply in the second operating state based on the measured charge data from the charge sensor, (d) during one of the first and second time periods, performing one of a calculation of an upstream charge on the object based in part on the sensed current flow and a determination of a relative condition of the at least one ionizer, and (e) periodically repeating steps (a)-(d) for successive pairs of the first and second time periods.

Yet another embodiment of the present invention comprises a method for monitoring the condition of an ionization system for applying or removing charge from a moving object. The ionization system has a power supply configured to provide an output to at least one ionizer, and a controller coupled to the power supply. The power supply has a first operating state such that one or more properties of the output are set to fixed non-zero baseline levels, and a second operating state such that the one or more properties of the output are set to neutralizing levels. The fixed non-zero baseline level for at least one of the one or more properties is different than the neutralizing level for the at least one of the one or more properties. The controller is configured to switch the power supply between the first and second operating states during a sequence of a plurality of alternating first and second time periods. The method includes (a) during the first time period only, sensing a current flow to the at least one ionizer with the power supply set to the first operating state, (b) during the second time period only, setting the power supply to the second state and allowing an operator to change at least one of the neutralizing levels for the one or more properties of the output of the power supply based on charge data measured by a charge sensor located downstream of the at least one ionizer, (c) during one of the first and second time periods, performing one of a calculation of an upstream charge on the object based in part on the sensed current flow and a determination of a relative condition of the at least one ionizer, and (d) periodically repeating steps (a)-(c) for successive pairs of the first and second time periods.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings:

FIG. 2 is a timeline showing alternating and repeating time periods for use in accordance with preferred embodiments of the present invention;

FIG. 3 is a flowchart of an exemplary process for closed-loop feedback operation of the ionization system of FIG. 1 in accordance with preferred embodiments of the present invention.

DETAILED DESCRIPTION OF THE INVENTION

Certain terminology is used in the following description for convenience only and is not limiting. The words "a" and "an", as used in the claims and in the corresponding portions of the specification, mean "at least one."

Figure 1:
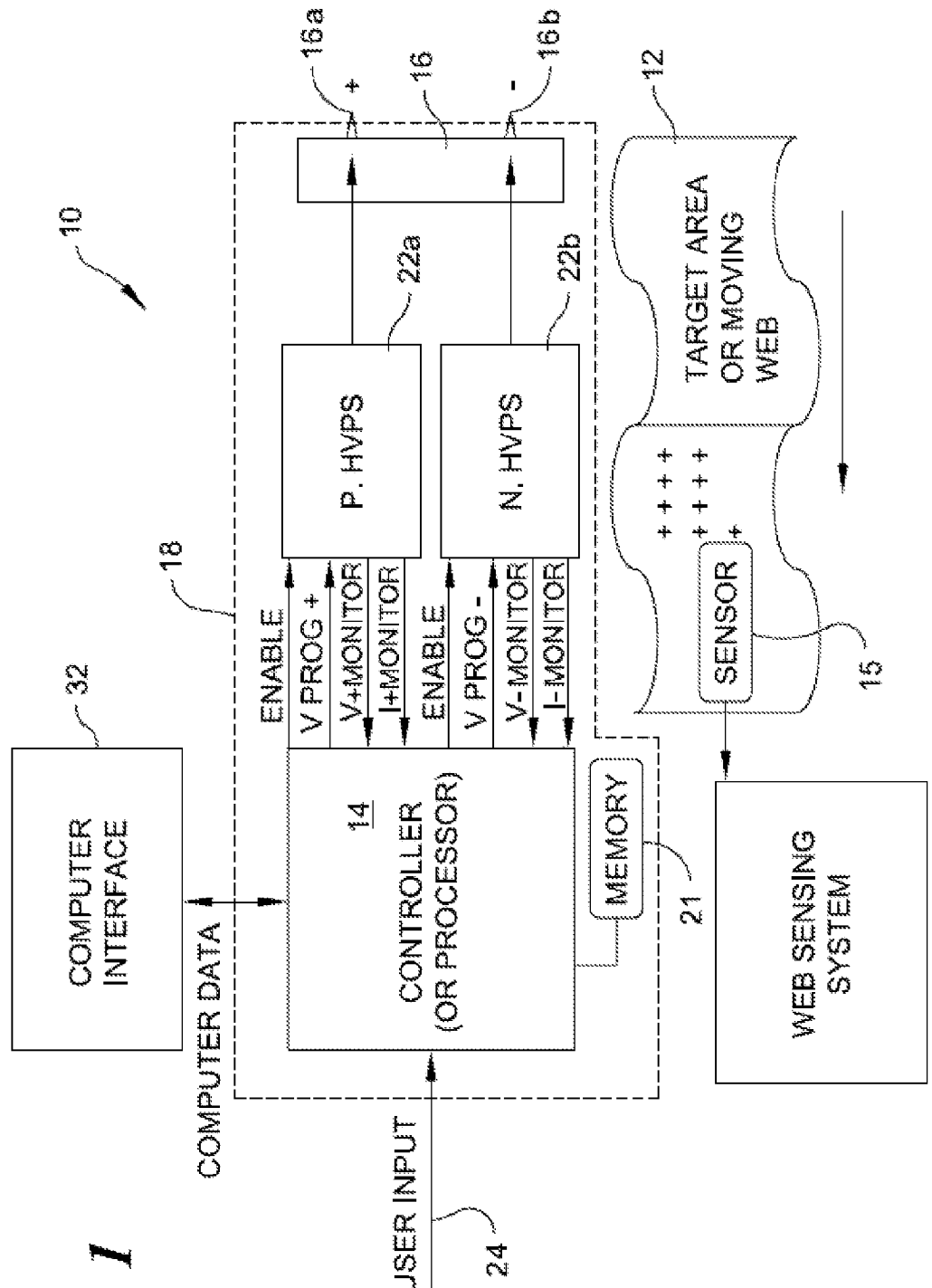
FIG. 1 is a schematic block diagram of an ionization system in accordance with a preferred embodiment of the present invention.

Referring to FIG. 1, a first embodiment of an ionization system 10 is shown. The ionization system 10 includes a controller, processor, or other controlling circuitry 14 or processor 14 (for simplicity, hereinafter referred to as "controller 14") that preferably controls the functionality of the ionization system 10. The controller 14 may accept input directly from a user 24, a computer interface 32 coupled to an external computer (not shown), or the like. Various high voltage generating topologies can be used in the preferred embodiments of the present invention. In particular, various controllers 14, such as microcontrollers or microprocessors, can be used in the application of the preferred embodiments of the present invention. One suitable controller 14 is the commercially available Z8 Encore microprocessor manufactured by Zilog, Inc. The controller 14 is also preferably further in communication with a memory 21, which can be any known or suitable memory device such as random access memory (RAM), read only memory (ROM), flash RAM, hard disk, optical disk, or the like.

The controller 14 is coupled to one or more high voltage (HV) power supplies 22a, 22b, and preferably a positive HV power supply 22a and a negative HV power supply 22b. However, other HV power supplies, such an alternating current (AC) power supply, may also be used in accordance with the invention. The HV power supplies 22a, 22b supply power, preferably having a voltage in the range of about 3 kilo-Volts (kV) to about 60 kV, to an ionization emitter 16, shown in FIG. 1 as an ionizer bar 16. In a preferred embodiment, the ionizer bar 16 includes one or more ionizing pins 16a associated with the positive HV power supply 22a and a corresponding number of ionizing pins 16b associated with the negative HV power supply 22b. In other embodiments, one or pins may be alternately connected to positive and negative outputs by switches or the like, or to an AC HV power supply. In embodiments with a single direct current (DC) HV power supply, the ionizing pins of the ionizer bar 16 would receive only one polarity. The controller 14 controls the output of the HV power supplies 22a, 22b to the ionizer bar 16.

In a preferred embodiment, the controller 14, the HV power supplies 22a, 22b, and the ionizer bar 16 are disposed within a common housing 18. This eliminates the need for high voltage cables to connect the ionizer bar 16 to the power supplies 22a, 22b and provides a more efficiently sized ionization system 10. However, embodiments of the present invention may be used with other configurations, such as, for example, configurations where the ionizer bar 16 would be located externally from the HV power supplies 22a, 22b and connected via high voltage power cables (not shown) or the like.

The output of the ionizer bar 16 is preferably utilized to apply or remove charge from a moving object 12, such as a moving web, that is brought within proximity of the ionizer bar 16. Downstream of the ionizer bar 16 is an external sensor 15 that detects a residual charge on the moving object 12. During normal operation, data from the sensor 15 is passed into the controller 14. Based on the sensor data, the controller 14 generates and outputs signals representing adjustments necessary to the output of the HV power supplies 22a, 22b in order to optimize ionization for the target object 12, thereby providing closed-loop feedback for the ionization system 10. In a preferred embodiment an ENABLE signal is provided to the HV power supplies 22a, 22b to set the timing of the high voltage pulses. Similarly, a V PROG+/− signal is provided to set the respective output levels of the HV power supplies 22a, 22b. These and/or other signals may be adjusted during operation in response to the data received at the controller 14 from the sensor 15.

In another embodiment, the downstream sensor 15 may be a hand-held field meter or a like manual sensor. Charge data collected by the hand-held field meter may be examined by the operator. The operator may be allowed to manually adjust one or more settings of the ionizer (e.g., amplitude, duty cycle, frequency, or the like) to desired levels based on the measured charge data. The operator changes may be made through the user input 24, the computer interface 32, or the like. The operator may perform measurements and manual adjustments as frequently or infrequently as necessary.

Embodiments of the present invention effectively use the ionizer bar 16 as an "upstream sensor" for determining the upstream charge on the target object 12 (e.g., via the V+/− monitor and/or I+/− monitor signals). When the target object 12 bears a charge of a certain threshold, current flow at the pins 16a, 16b of the ionizer bar 16 may be induced or suppressed, based on the polarity of the charge on the target object 12. A difference between an expected current flow and the actual current flow is proportional to the charge on the target object 12. One method of measuring current flow at the pins 16a, 16b is described in U.S. Pat. No. 6,130,815 (Pitel et al.) and U.S. Pat. No. 6,259,591 (Pitel et al.), the entire contents of both of which are incorporated by reference herein.

For example, the net neutralization current output $I_{neut}$ at the ionizer pins 16a, 16b of the ionizer bar can be determined by the following equation:

$$I_{neut} = I^+ - I^- - I_0$$

where $I^+$ is the absolute value of the output current at the positive ionizer pins 16a, $I^-$ is the absolute value of the output current at the negative ionizer pins 16b, and $I^-$ is a neutralization current present at time t=0, essentially a correction factor, which ideally would be equal to zero. The net neutralization output current $I_{neut}$ is proportional to charge on the target object 12, speed of the target object 12, and distance of the pins 16a, 16b from the target object 12. If there is insufficient charge on the target object 12 to induce or suppress current at the ionizer bar 16, then in most cases the net neutralization output current $I_{neut}$ would be zero. If $I_{neut} > 0$, then the charge on the target object 12 is negative, but if, on the other hand, $I_{neut} < 0$, then the charge on the target object 12 is positive.

It should be further noted that a normalized net current value $I_{norm}$ can be used to correct for effects caused by the length of the ionizer bar 114. The normalized net current is given by the equation:

$$I_{norm} = I_{neut}/I_{mag}$$

where $I_{mag}$ represents the magnitude of the neutralization current, which is given by the equation:

$$I_{mag} = I^+ + I^-$$

The charge density σ on the target object 12 can be calculated based on the following equation:

$$\sigma = I_{neut}/(K \cdot v \cdot W)$$

where v represents the velocity of the target object 12 and W represents the width of the target object 12 covered by the ionizer bar 16 (which is the shorter of the length of the ionizer bar 16 or a width of the object). K represents the neutralizing efficiency, given by the equation:

$$K = 1 - (\text{residual charge}/\text{initial charge})$$

which can range in value from 0.1 to 1.1. The actual value depends on the type of ionization emitter 16, its condition, its installation, distance from the target object 12, and other variables.

From the charge density σ, the electric field strength E can also be determined by the following equation:

$$E = \sigma/\epsilon_0 = I_{neut}/(\epsilon_0 K \cdot v \cdot W)$$

where $\epsilon_0$ represents the permittivity of free space.

According to embodiments of the present invention, these concepts are utilized by interleaving periods of sampling at the ionizer bar 16 with periods of normal closed-loop feedback operation for neutralizing the target object 12. For example, FIG. 2 shows a timeline 100 of operation of the ionization system 10, which includes alternating periods of normal closed-loop feedback operation 102, wherein the ionization system 10 is operating under normal conditions to neutralize charge on the target object 12 based on feedback from the downstream sensor 15, with sampling periods 104, during which data is collected by the controller 14, which can be used to determine the upstream charge on the incoming target object 12 and/or to determine a condition of the ionizer bar 16. It is preferred that the length and frequency of the sampling periods 104 is kept to a minimum, as the ionizing capabilities of the system 10 are may be lessened during the sampling period 104. It is preferred that a ratio of a length of the normal operating period 102 to a length of the sampling period 104 is about 100:1, although other ratios are contemplated as well. In addition, the ratio may be defined by the operator according to specific operating requirements. For example, the condition of the ionizer bar 16 and the charge on the target object 12 may change relatively slowly, so that the operator can tune the ratio to specific needs.

FIG. 3 is a flow chart of an exemplary method 200 performed by the controller 14 in accordance with preferred embodiments of the present invention. During normal closed-loop feedback operation, the controller 14 may check (step 202) whether a sampling period should be entered. If not, the controller 14 continues in the closed-loop feedback operation and performs other conventional main loop processes (step 204), and adjusts set points if necessary (e.g., amplitude, duty cycle, or the like) (step 206) based on input received from the sensor 15 or received from manual operator input (e.g., via user input 24 or computer interface 32) based on data measured by the sensor 15 (step 205).

Figure 4:
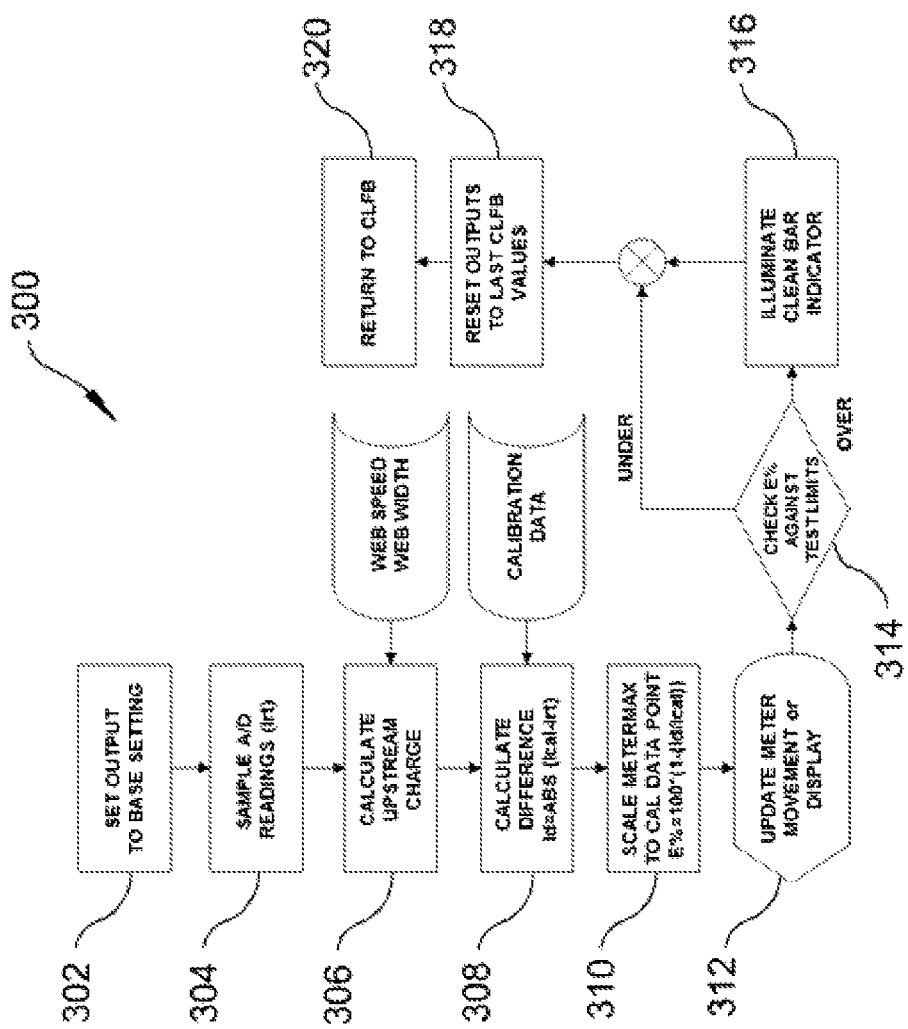
FIG. 4 is a flowchart of an exemplary process for operation during a sampling period of the ionization system of FIG. 1 in accordance with preferred embodiments of the present invention.

However, if at step 202 a sampling period is to be entered, the controller 14 may enter the exemplary method 300 shown in FIG. 4. Upon entering a sampling period, the power supplies 22a, 22b are set to baseline levels (step 302). For example, typically the output to the ionizer bar 16 is a waveform having a duty cycle, amplitude, frequency, and the like. However, in certain embodiments, the output to the respective ionizing pins 16a, 16b may be uni-polar DC signals, in which case both the positive and negative HV power supplies 16a, 16b are constantly on, rather than pulsing. The controller 14 may set the amplitude of the output of the positive and negative HV power supplies 22a, 22b to a fixed non-zero baseline level, for example between about 4 kV to about 20 kV. The duty cycle (i.e., the ratio of positive to negative ion generation during a cycle of the waveform) is also preferably set to 50/50. The frequency and/or other characteristics of the waveform can also be set to fixed non-zero baseline levels during the sampling period. By maintaining fixed non-zero baseline voltage levels at the ionizing pins 16a, 16b during the sampling period, the ionization system 10 can continue to apply or remove charge on the target object 12 during the sampling period, with the effectiveness of an open-loop system.

In an alternative embodiment, the step of setting the output to baseline levels 302 may include shutting down the voltage output to the ionizer bar 16 from the power supplies 22a, 22b. For example, the power supplies 22a, 22b may be placed into a mode or set to a set point such that no signal is output to the ionizer bar 16 (e.g., VPROG=0). As a result, the ionizing pins 16a, 16b are not held at any voltage, and current generated at the pins 16a, 16b is purely the result of charge on the target object 12.

At step 304, A/D readings are sampled, such as the current to the ionizing pins 16a, 16b sensed by the controller 120. At step 306, the upstream charge on the target object 12 may be calculated based in part on the sensed current flow, as described above. The calculation in step 306 also preferably takes into account data regarding the target or web 12 speed and/or width (as measured perpendicularly to the downstream direction), as described above. Other like data may also be considered. The speed, width, and other relevant data may be provided by sensors (not shown), although it is preferred that the data is input to the controller 14 via the user input 24 and/or via the computer interface 32.

Data collected at step 304 during the sampling period may also be used to determine the relative condition of the of the ionizer bar 16. Previously determined calibration data may retrieved from memory 21 for the fixed non-zero baseline levels. An absolute percentage difference is calculated (step 308) from the stored value and the real time reading. In a preferred embodiment the calculation used to determine the difference is:

$$I_D = [I_{cal} - I_{mag}]$$

where $I_D$ is the absolute value of base line calibration measurement ($I_{cal}$) minus the real-time measurement ($I_{mag}$). The retrieved $I_{cal}$ is assigned a value of 100%. An error from 100% is calculated (step 310). The percentage difference E % from the baseline calibration is calculated by the following equation:

$$E\% = 100 * (1 - (I_D / I_{cal}))$$

Upon calculation of the percentage difference, the meter or display of the ionization system 10 is updated (step 312) to indicate operating conditions of the ionizer bar 16. The percentage difference E % is compared against threshold limits for the ionizer bar selected (step 314). A clean bar indicator (not shown) is illuminated when the threshold limit is exceeded (step 316). The threshold for the limit wherein the ionizer bar should be cleaned can be configured by the user, a sensor, a microprocessor, or set by software coupled to or located within the controller 120.

Use of the sampling period also aids in making the self-calibration and performance indication of the ionization system more efficient. The current magnitude $I_{mag}$ is determined from data acquired by the controller 14 during the sampling period (i.e., in step 304). Thus, the calibration set point is preferably identical to the fixed non-zero baseline levels described above (e.g., nominal amplitude and 50/50 duty cycle or the like). By determining the current magnitude based on the fixed non-zero baseline levels during the sampling period, the results can be compared to a single data point, rather than to hundreds of set points encompassing the full operating range of the power supplies 22a, 22b as programmed by the controller 14. In addition, such a method would remove the need for obtaining calibration data for hundreds of baseline values at the start of operation. However, it is contemplated that other conventional methods for determining error and operating condition in the ionization system 10 can be used as well. In a preferred embodiment, data collected during the sampling period is used for both determining upstream charge on the target object 12 and determining a condition of the ionizer bar 16, although the collected data may be used for other purposes as well.

Following illumination of the clean bar indicator at step 316, or if the percentage difference does not exceed the threshold limit, the controller at step 318 preferably resets the power supplies 22a, 22b to the last closed-loop feedback operating levels in effect prior to entering of the sampling period. At step 320, the closed loop feedback operation method is re-entered by the controller 14 (i.e., returns to the method 200 in FIG. 3). Upon entry of the next sampling period, the method 300 is repeated.

In another embodiment, only the sampling at step 304 occurs during the sampling period. That is, following step 304, the controller may return directly to step 318 and closed-loop feedback operation. Steps 306-316, wherein the calculations are performed for determining upstream charge on the object 12 and the condition of the ionizer bar 16 may be done during normal operation. In this way, the length of the sampling period may be reduced even further to minimize adverse effects on the application or removal of charge from the object 12.

During the sampling period, data from the downstream sensor 15 may be disregarded by the controller 14. In other embodiments, communication between the sensor 15 and the controller 14 may be disrupted, or the sensor 15 may be placed into a sleep mode or be shut down (e.g., deactivated) for the duration of the sampling period. Similarly, during a sampling period, the operator may be unable to make any adjustments to the neutralizing levels.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An ionization system for applying or removing charge to a moving object, the system comprising:
   (a) a power supply;
   (b) at least one ionizer coupled to the power supply and receiving an output therefrom, the power supply having a first operating state such that one or more properties of the output are set to fixed non-zero baseline levels, and a second operating state such that the one or more properties of the output are set to neutralizing levels, the fixed baseline level for at least one of the one or more properties of the output being different than the neutralizing level for the at least one of the one or more properties;
   (c) a charge sensor arranged downstream of the at least one ionizer and configured to measure a charge on the object; and
   (d) a controller coupled to an output of the charge sensor and coupled to the power supply to control the output to the at least one ionizer, the controller being configured to:
      (i) switch the power supply between the first and second states during a sequence of a plurality of alternating first and second time periods,
      (ii) during the first time period only, sense a current flow to the at least one ionizer with the power supply set to the first operating state,
      (iii) during the second time period only, set the power supply to the second state and receive measured charge data from the charge sensor, (iv) during the second time period only, adjust at least one of the neutralizing levels for the one or more properties of the output of the power supply in the second operating state based on the measured charge data from the charge sensor,
(v) during one of the first and second time periods, perform at least one of a calculation of an upstream charge on the object based in part on the sensed current flow and a determination of a relative condition of the at least one ionizer, and
(vi) periodically repeat steps (ii)-(v) for successive pairs of the first and second time periods.

2. The system of claim 1, wherein the at least one ionizer includes at least one positive ionizer and at least one negative ionizer.

3. The system of claim 2, further comprising a memory in communication with the controller and configured to store calibration data for determining the relative condition of the at least one positive ionizer and the at least one negative ionizer, the controller being further configured to:
(vii) during one of the first and second time periods, sum the current flow to the at least one positive ionizer and the current flow to the at least one negative ionizer to determine a current magnitude with the power supply set to the first operating state,
(viii) compare the current magnitude to the calibration data to determine difference values, and
(ix) use the difference values to determine the relative condition of the at least one positive ionizer and the at least one negative ionizer.

4. The system of claim 2, wherein the one or more properties of the output includes a first amplitude applied to the at least one positive ionizer, a second amplitude applied to the at least one negative ionizer, and a duty cycle, wherein each fixed non-zero baseline level for each of the first and second amplitudes is between about 4 kV to about 20 kV, and wherein the fixed non-zero baseline level for the duty cycle is 50/50.

5. The system of claim 2, wherein the sensed current flow is a net of current flow to the at least one positive ionizer and current flow to the at least one negative ionizer.

6. The system of claim 1, wherein the calculated upstream charge on the object is also based in part on a speed of the object and a width of the object as measured perpendicularly to the downstream direction of the object.

7. The system of claim 6, further comprising:
(e) a user input coupled to the controller and configured to receive data regarding the speed and width of the object.

8. The system of claim 1, wherein step (v) is performed during the first time period.

9. The system of claim 1, wherein a ratio of a length of the second time period to a length of the first time period is about 100:1.

10. A method for monitoring the condition of an ionization system for applying or removing charge from a moving object, the ionization system having a power supply configured to provide an output to at least one ionizer, a charge sensor arranged downstream of the at least one ionizer, and a controller coupled to an output of the charge sensor and to the power supply, the power supply having a first operating state such that one or more properties of the output are set to fixed non-zero baseline levels, and a second operating state such that the one or more properties of the output are set to neutralizing levels, the fixed non-zero baseline level for at least one of the one or more properties being different than the neutralizing level for the at least one of the one or more properties, the controller being configured to switch the power supply between the first and second operating states during a sequence of a plurality of alternating first and second time periods, the method comprising:
(a) during the first time period only, sensing a current flow to the at least one ionizer with the power supply set to the first operating state;
(b) during the second time period only, setting the power supply to the second state and receiving measured charge data from the charge sensor;
(c) during the second time period only, adjusting at least one of the neutralizing levels for the one or more properties of the output of the power supply in the second operating state based on the measured charge data from the charge sensor;
(d) during one of the first and second time periods, performing one of a calculation of an upstream charge on the object based in part on the sensed current flow and a determination of a relative condition of the at least one ionizer; and
(e) periodically repeating steps (a)-(d) for successive pairs of the first and second time periods.

11. The method of claim 10, wherein the at least one ionizer includes at least one positive ionizer and at least one negative ionizer.

12. The method of claim 11, wherein the ionization system includes a memory, the method further comprising:
(f) storing calibration data for determining the relative condition of the at least one positive ionizer and the at least one negative ionizer;
(g) during one of the first and second time periods, summing the current flow to the at least one positive ionizer and the current flow to the at least one negative ionizer to determine a current magnitude with the power supply set to the first operating state;
(h) comparing the current magnitude to the calibration data to determine difference values; and
(i) using the difference values to determine the relative condition of the at least one positive ionizer and the at least one negative ionizer.

13. The method of claim 11, wherein the one or more properties of the output includes a first amplitude applied to the at least one positive ionizer, a second amplitude applied to the at least one negative ionizer, and a duty cycle, wherein each fixed non-zero baseline level applied during the first time period for each of the first and second amplitudes is between about 4 kV to about 20 kV, and wherein the fixed non-zero baseline level applied during the first time period for the duty cycle is 50/50.

14. The method of claim 10, wherein the calculated upstream charge on the object is also based in part on a speed of the object and a width of the object as measured perpendicularly to the downstream direction of the object.

15. The method of claim 14, further comprising:
(f) receiving, via a user input coupled to the controller, data regarding the speed and width of the object.

16. The method of claim 10, wherein step (d) is performed during the first time period.

17. The method of claim 10, wherein a ratio of a length of the second time period to a length of the first time period is about 100:1.

18. The method of claim 10, further comprising deactivating the charge sensor during the first time period.

19. A method for monitoring the condition of an ionization system for applying or removing charge from a moving object, the ionization system having a power supply configured to provide an output to at least one ionizer, and a controller coupled to the power supply, the power supply having a first operating state such that one or more properties of the output are set to fixed non-zero baseline levels, and a second operating state such that the one or more properties of the output are set to neutralizing levels, the fixed non-zero baseline level for at least one of the one or more properties being different than the neutralizing level for the at least one of the one or more properties, the controller being configured to switch the power supply between the first and second operating states during a sequence of a plurality of alternating first and second time periods, the method comprising:

(a) during the first time period only, sensing a current flow to the at least one ionizer with the power supply set to the first operating state;

(b) during the second time period only, setting the power supply to the second state and allowing an operator to change at least one of the neutralizing levels for the one or more properties of the output of the power supply based on charge data measured by a charge sensor located downstream of the at least one ionizer;

(c) during one of the first and second time periods, performing one of a calculation of an upstream charge on the object based in part on the sensed current flow and a determination of a relative condition of the at least one ionizer; and (d) periodically repeating steps (a)-(c) for successive pairs of the first and second time periods.

* * * * *